(12) United States Patent
Cashman et al.

(10) Patent No.: US 7,400,574 B2
(45) Date of Patent: *Jul. 15, 2008

(54) METHOD AND APPARATUS FOR MANAGING A LOOP NETWORK

(75) Inventors: Paul Nicholas Cashman, Alton (GB); Carlos Francisco Fuente, Portsmouth (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/735,568

(22) Filed: Apr. 16, 2007

(65) Prior Publication Data

US 2007/0183336 A1    Aug. 9, 2007

Related U.S. Application Data

(63) Continuation of application No. 10/150,580, filed on May 17, 2002, now Pat. No. 7,269,131.

(30) Foreign Application Priority Data

Aug. 6, 2001    (GB) .................................. 0119070.1

(51) Int. Cl.
*H04L 1/00* (2006.01)
*H04L 12/26* (2006.01)

(52) U.S. Cl. .................. 370/217; 370/222; 370/223; 370/254; 370/403; 370/405; 370/453

(58) Field of Classification Search ......... 370/216–228, 370/453, 403, 405, 254; 709/222; 714/4
See application file for complete search history.

(56) References Cited

U.S. PATENT DOCUMENTS

| | | | |
|---|---|---|---|
| 6,014,383 A | 1/2000 | McCarty ..................... 370/453 |
| 6,353,612 B1 * | 3/2002 | Zhu et al. .................... 370/360 |
| 6,424,094 B1 | 7/2002 | Steinmetz et al. ........... 710/305 |
| 6,425,034 B1 * | 7/2002 | Steinmetz et al. ........... 710/305 |
| 6,504,817 B2 * | 1/2003 | Oldfield et al. ............. 370/217 |
| 6,546,498 B1 * | 4/2003 | Saegusa ......................... 714/4 |
| 6,671,727 B1 * | 12/2003 | Odenwald .................... 709/227 |
| 6,973,484 B1 * | 12/2005 | Singhal et al. .............. 709/216 |
| 6,980,510 B1 * | 12/2005 | Deitz et al. .................. 370/217 |
| 7,012,914 B2 | 3/2006 | Berman ...................... 370/351 |
| 7,274,673 B2 * | 9/2007 | Beer et al. ................... 370/258 |
| 2002/0174168 A1 | 11/2002 | Beukema et al. ............ 709/201 |
| 2003/0137987 A1 * | 7/2003 | Beer et al. ................... 370/453 |
| 2003/0140227 A1 * | 7/2003 | Asano et al. ................. 713/157 |
| 2007/0183316 A1 * | 8/2007 | Beer et al. ................... 370/222 |

\* cited by examiner

OTHER PUBLICATIONS

American National Standard for Information Technology, Fibre Channel Arbitrated Loop (FC-AL-2) Revision 7.0, Apr. 1, 1999.

*Primary Examiner*—Edan Orgad
*Assistant Examiner*—Ho Chuong
(74) *Attorney, Agent, or Firm*—Harrington & Smith, PC

(57) ABSTRACT

A method and apparatus for managing a loop network, the loop network (200) including at least one loop (206, 208), a plurality of devices (210) connected to the at least one loop (206, 208) via ports (211, 212), wherein at least two of the devices are initiators (207, 209). The method includes each initiator (207, 209) sending a frame to all other initiators (207, 209) in the loop network (200) identifying any ports (211, 212) which should not be used. Each initiator (207, 209) merges the information from all other initiators (207, 209) with its own information identifying any ports (211, 212) which should not be used resulting in all the initiators (207, 209) generating a single list of ports (211, 212) to be used which is consistent across all the initiators (207, 209). Each initiator (207, 209) applies an algorithm (300) to determine a common set of ports (211, 212) to be used by all the initiators (207, 209) and to balance port accesses across the loop network (200).

4 Claims, 4 Drawing Sheets

METHOD AND APPARATUS FOR MANAGING A LOOP NETWORK

CROSS REFERENCE TO RELATED APPLICATIONS

This application is a continuation of U.S. patent application Ser. No. 10/150,580, filed May 17, 2002 now U.S. Pat. No. 7,269,131, which claims priority from U.K. Patent Application Serial No. GB 0119070.1, filed on Aug. 6, 2001.

FIELD OF INVENTION

This invention relates to a method and apparatus for managing a loop network. In particular, the invention relates to managing Fibre Channel Arbitrated Loops. The invention could equally apply to managing other unidirectional loops, for example, Token Ring networks, FDDI (Fibre Data Distributed Interfaces), etc

BACKGROUND OF THE INVENTION

Fibre Channel Arbitrated Loop (FC-AL) architecture is a member of the Fibre Channel family of ANSI standard protocols. FC-AL is typically used for connecting together computer peripherals, in particular disk drives. The FC-AL architecture is described in NCITS working draft proposal, American National Standard for Information Technology "Fibre Channel Arbitrated Loop (FC-AL-2) Revision 7.0", 1 Apr. 1999.

Electronic data systems can be interconnected using network communication systems. Area-wide networks and channels are two technologies that have been developed for computer network architectures. Area-wide networks (e.g. LANs and WANs) offer flexibility and relatively large distance capabilities. Channels, such as the Small Computer System Interface (SCSI), have been developed for high performance and reliability. Channels typically use dedicated short-distance connections between computers or between computers and peripherals.

Fibre Channel technology has been developed from optical point-to-point communication of two systems or a system and a subsystem. It has evolved to include electronic (non-optical) implementations and has the ability to connect many devices, including disk drives, in a relatively low-cost manner. This addition to the Fibre Channel specifications is called Fibre Channel Arbitrated Loop (FC-AL).

Fibre Channel technology consists of an integrated set of standards that defines new protocols for flexible information transfer using several interconnection topologies. Fibre Channel technology can be used to connect large amounts of disk storage to a server or cluster of servers. Compared to Small Computer Systems Interface (SCSI), Fibre Channel technology supports greater performance, scalability, availability, and distance for attaching storage systems to network servers.

Fibre Channel Arbitrated Loop (FC-AL) is a loop architecture as opposed to a bus architecture like SCSI. FC-AL is a serial interface, where data and control signals pass along a single path rather than moving in parallel across multiple conductors as is the case with SCSI. Serial interfaces have many advantages including: increased reliability due to point-to-point use in communications; dual-porting capability, so data can be transferred over two independent data paths, enhancing speed and reliability; and simplified cabling and increased connectivity which are important in multi-drive environments. As a direct disk attachment interface, FC-AL has greatly enhanced I/O performance.

Devices are connected to a FC-AL using hardware which is termed a "port". A device which has connections for two loops has two ports or is "dual-ported".

The operation of FC-AL involves a number of ports connected such that each port's transmitter is connected to the next port's receiver, and so on, forming a loop. Each port's receiver has an elasticity buffer that captures the incoming FC-AL frame or words and is then used to regenerate the FC-AL word as it is re-transmitted. This buffer exists to deal with slight clocking variations that occur. Each port receives a word, and then transmits that word to the next port, unless the port itself is the destination of that word, in which case it is consumed. The nature of FC-AL is therefore such that each intermediate port between the originating port and the destination port gets to 'see' each word as it passes around the FC-AL loop.

FC-AL architecture may be in the form of a single loop. Often two independent loops are used to connect the same devices in the form of dual loops. The aim of these loops is to provide an alternative path to devices on a loop should one loop fail. A single fault should not cause both loops to fail simultaneously. More than two loops can also be used.

FC-AL devices typically have two sets of connections allowing them to be attached to two FC-ALs. Thus, in a typical configuration, two independent loops exist and each device is physically connected to both loops. When the system is working optimally, there are two possible loops that can be used to access any dual-ported device.

A FC-AL can incorporate bypass circuits with the aim of making the FC-AL interface sufficiently robust to permit devices to be removed from the loop without interrupting throughput and sacrificing data integrity. If a disk drive fails, port bypass circuits attempt to route around the problem so all disk drives on the loop remain accessible. Without port bypass circuits a fault in any device will break the loop.

In dual loops, port bypass circuits are provided for each loop and these provide additional protection against faults. A port can be bypassed on one loop while remaining active on the dual loop.

A typical FC-AL may have one or two host bus adapters (HBA) and a set of six or so disk drive enclosures or drawers, each of which may contain a set of ten to sixteen disk drives. There is a physical cable connection between each enclosure and the HBA in the FC-AL. Also, there is a connection internal to the enclosure or drawer, between the cable connector and each disk drive in the enclosure or drawer, as well as other components within the enclosure or drawer, e.g. SES device (SCSI Enclosure Services node) or other enclosure services devices.

Components in a loop can be categorised as "initiators" or "targets", or both depending on their function in the loop. For example, a host bus adapter is an initiator and a disk drive is a target. Initiators can arbitrate for a communication path in the loop and can choose a target. A target can request the transfer of a command, data, status, or other information to or from the initiator.

If there is a single initiator in a loop, the initiator will login with all the targets in the loop. Targets may accept or reject this login attempt. At any later stage a target can log out with any logged in initiator. In a multi-initiator environment, an initiator operates as both a sender and recipient login attempts.

When target devices such as disk drives are provided on dual loops with a port on each loop, such devices do not necessarily cope with being accessed by the same or by different initiators on both ports. This may even cause data transfer rates to be reduced because of the overhead in switching between ports. It is also possible that there are ordering issues to worry about.

There may be other advantages in only accessing target devices via one port, such as being able to bypass redundant ports. Therefore, accessing multi-ported targets via only one port is proposed.

Devices may not accept or correctly complete log in procedures and this is a problem if devices do not present the same view to each initiator.

Providing multiple initiators in a loop network should increase performance levels and achieve a higher degree of connectivity. Therefore, management of a loop network with more than one initiator is proposed. Accesses to dual-ported devices in a loop network should be balanced to evenly distribute the accesses to devices over both of the dual ports. This needs to be co-ordinated with the proposal to access devices through only one port for all initiators.

It is an aim of the present invention to provide management of a loop network with more than one initiator to provide a consistent view of the devices in the loop network and to balance the accesses to the devices.

DISCLOSURE OF THE INVENTION

According to a first aspect of the present invention there is provided a method for managing a loop network, the loop network including at least one loop, a plurality of devices connected to the at least one loop via ports, wherein at least two of the devices are initiators, the method including: each initiator sending a frame to all other initiators in the loop network identifying any ports which should not be used; each initiator merging the information from all other initiators with its own information identifying any ports which should not be used; resulting in all the initiators generating a single list of ports to be used which is consistent across all the initiators.

The frame may either list all the ports which can be used or all the ports which cannot be used.

A port may be identified as not to be used if it does not report a node name and a port name to an initiator during initialisation of a loop. A port may be identified as not to be used if it does not log on to an initiator.

Preferably, each initiator applies an algorithm to determine a common set of ports to be used by all the initiators and to balance port accesses across the loop network. The algorithm may select a least utilised route to a device. Accesses to ports may be sorted by a node name as a first key and a port name as a second key. The algorithm may count ports providing the only access to devices on each loop and may determine a balance value of accesses across the loops, the algorithm may seek to reduce the balance value towards zero.

The loop network may preferably be a Fibre Channel Arbitrated Loop (FC-AL) network with dual loops and at least some devices having ports on each of the dual loops.

According to a second aspect of the present invention there is provided a loop network including at least one loop, a plurality of devices connected to the at least one loop via ports, wherein at least two of the devices are initiators, the loop network also including: means for each initiator to send a frame to all other initiators in the loop network identifying any ports which should not be used; means for merging in each initiator the information from all other initiators with the initiator's own information identifying any ports which should not be used; resulting in a single list of ports to be used, the list being consistent across all the initiators.

At least one of the devices may be a dual ported device with a port on a first loop and a port on a second loop. The initiators may be host bus adapters and the devices may be disk drives.

The loop network may preferably be a Fibre Channel Arbitrated Loop (FC-AL) with dual loops.

According to a third aspect of the present invention there is provided a computer program product stored on a computer readable storage medium comprising computer readable program code means for managing a loop network, the loop network having at least one loop, a plurality of devices connected to the at least one loop via ports, wherein at least two of the devices are initiators, the program code means performing the steps of: each initiator sending a frame to all other initiators in the loop network identifying any ports which should not be used; each initiator merging the information from all other initiators with its own information identifying any ports which should not be used; resulting in all the initiators generating a single list of ports to be used which is consistent across all the initiators.

BRIEF DESCRIPTION OF THE DRAWINGS

Embodiments of the invention are now described, by means of examples only, with reference to the accompanying drawings in which.

DESCRIPTION OF THE PREFERRED EMBODIMENTS

A loop network system with a plurality of serially connected ports in the form of a Fibre Channel Arbitrated Loop (FC-AL) is described for connecting together computer peripherals, in particular disk drives. The described embodiments are given in the context of FC-AL architecture although the described method and apparatus could be applied to any unidirectional loop network.

Figure 1:
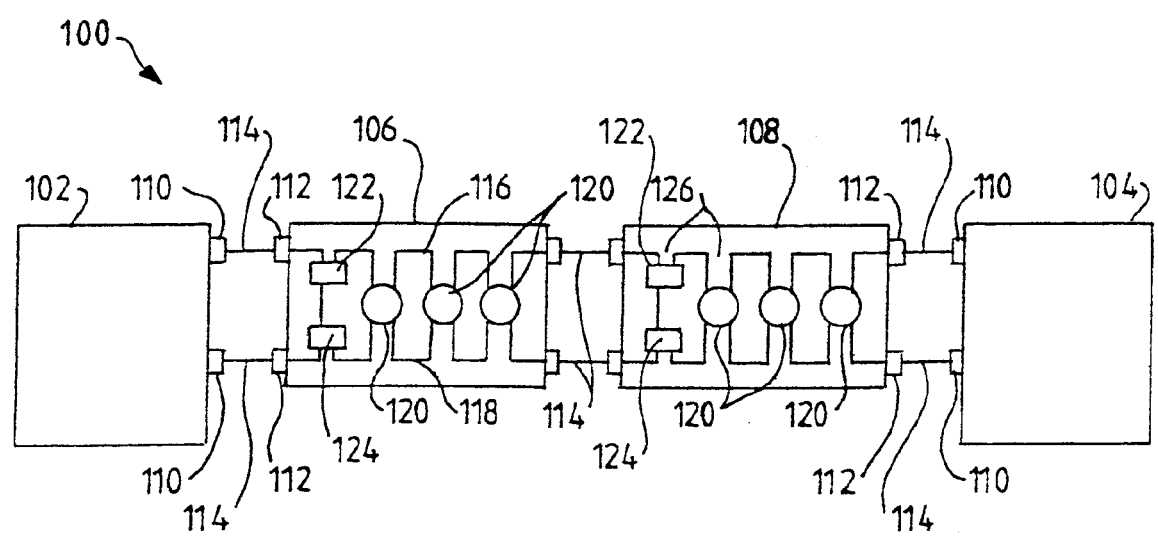
FIG. 1 is a diagram of a dual loop network in which the teaching of the present invention may be practiced.

Referring to FIG. 1, an exemplary loop network 100 is shown in the form of a Fibre Channel Arbitrated Loop with two host bus adapters 102, 104. FIG. 1 shows one form of a loop network on which the present invention may be practiced. However, not all the components of the loop network 100 of FIG. 1 are essential for the operation of the present invention.

The loop network 100 in the shown embodiment has two enclosures 106, 108. Each enclosure in this embodiment has three disk drives 120 although in practice there are usually 10 or more disk drives in an enclosure. Dual loops 116, 118 each connect the components in the loop network 100. A first loop 116 is shown along the top of the loop network 100 in the diagram and a second loop 118 is shown along the bottom of the loop network 100 in the diagram.

The adapters 102, 104 have external connectors 110 for cables 114 connecting each loop 116, 118 from the adapters 102, 104 to external connectors 112 of the enclosures 106, 108. Cables 114 also connect the two enclosures 106, 108 such that each loop 116, 118 passes from one enclosure 106 to the next enclosure 108. 25

Each loop 116, 118 passes from the first adapter 102 via an adapter external connector 110, a cable 114 and an enclosure external connector 112 to the first enclosure 106. In the first enclosure 106 of the exemplary loop network 100, each loop 116, 118 passes through its own SES (SCSI Enclosure Services) device or controller 122, 124 and then through each of the disk drives 120 in turn. The two loops 116, 118 both pass through the same shared disk drives 120. Each loop 116, 118 then leaves the first enclosure via an enclosure external connector 112 and passes through a cable 114 to a second enclosure 108 which it enters via an enclosure external connector 112. The second enclosure 108 has the same set of components as the first enclosure 106. Each loop 116, 118, after passing through the second enclosure 108 is connected to the second adapter 104 via enclosure external connectors 112, cables 114 and adapter external connectors 110.

In each enclosure 106, 108, a loop 116 enters from an external connector 112 and is routed through each of the disk drives 120 and an SES device 122, 126. Each disk drive 120 or SES device 122, 126 has a bypass circuit to enable it to be bypassed by the loop, if required. The disk drives 120 are examples of dual port devices in that they are common to both the loops 116, 118 of the loop network 100.

An SES device 122, 124 is provided on each loop 116, 118 in each enclosure and the two SES devices 122, 124 are connected together through the enclosure's backplane. One SES device can be used to control the other SES device. An SES device manages an enclosure and provides a point of control for each enclosure. It can monitor parameters such as power and cooling and obtain information as to which slots for disk drives are occupied. It accepts a limited set of SCSI commands. SES devices can be used to instruct a bypass of a disk drive and to check which disk drives are bypassed.

In the embodiment shown in FIG. 1, a dual loop network 100 is shown by way of example, with two enclosures 106, 108 each with three disk drives 120 and two SES controllers 122, 124, one for each loop. Typical loop networks may have one or two host bus adapters and a set of six or so disk drive enclosures each of which may typically contain a set of ten to sixteen disk drives.

Figure 2A:
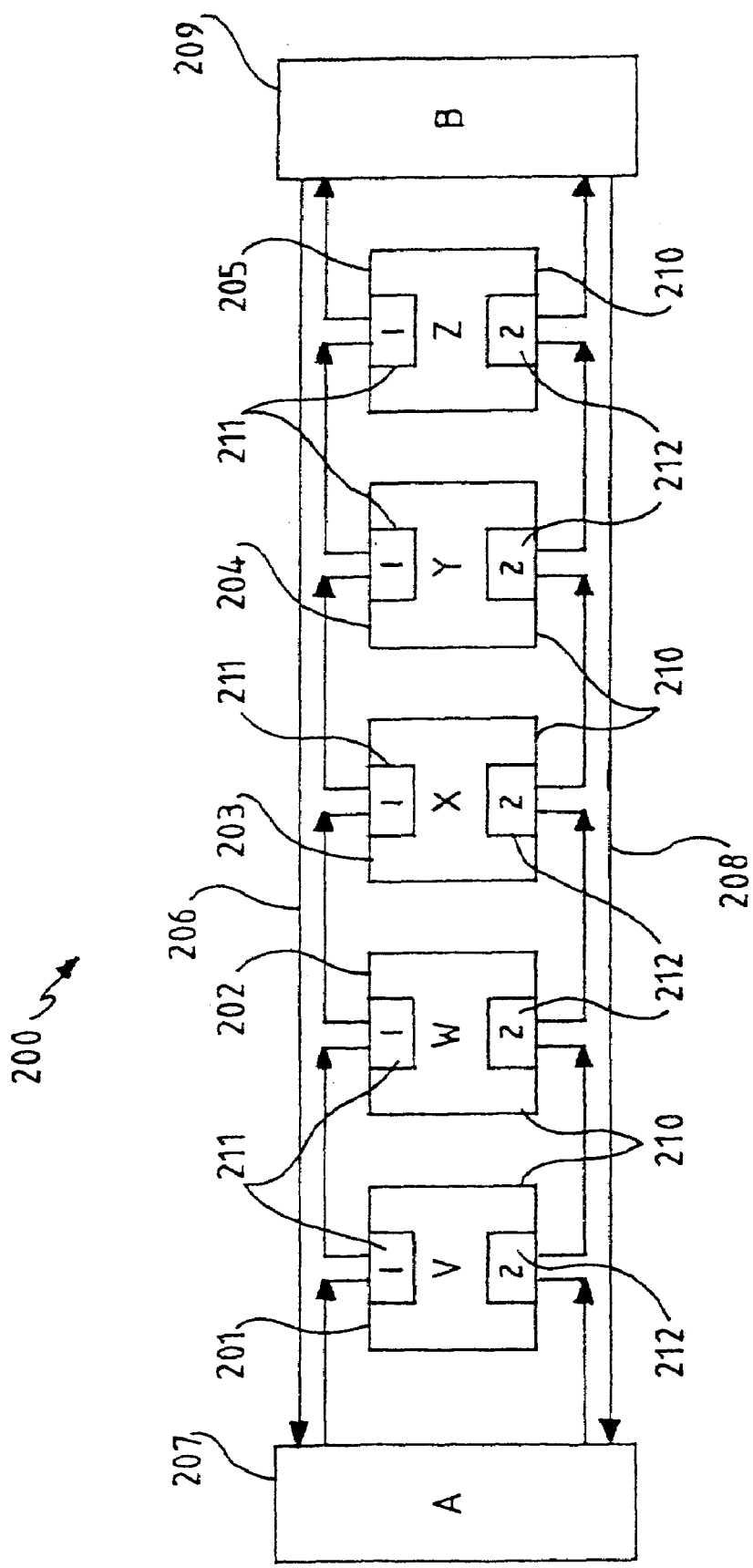
FIGS. 2A and 2B are diagrams of a dual loop network in accordance with the present invention.

All devices in the loop 100, including host bus adapters 102, 104, disk drives 120 and any enclosure controllers 122, 124 have hardware connections to a loop 106, 108 referred to as ports. Each port has a receiver and a transmitter. The ports are connected such that each port's transmitter is connected to the next port's receiver, and so on, forming the loop 106, 108. Each port's receiver has an elasticity buffer that captures the incoming FC-AL frame and is then used to regenerate the FC-AL frame as it is re-transmitted. Referring to FIG. 2A, a dual loop network 200 is shown in a simplified form with two initiators in the form of two host bus adapters A 207 and B 209 and five targets in the form of five devices 210 which are individually referred to as V 201, W 202, X 203, Y 204 and Z 205. The devices 210 may be disk drives or other loop components.

The loop network 200 has two loops 206, 208 and each of the devices 210 in the loop network 200 is dual ported in that each device 210 has a port 211, 212 on each loop 206, 208. Each port 211 on the first loop 206 will be referred to as port 1 and each port 212 on the second loop 208 will be referred to as port 2.

Devices 210 may also be included which are single ported with a single port on only one of the loops 206, 208.

During initialisation of a loop, a Loop Initialisation Procedure (LIP) allows each port 211, 212 to obtain an Arbitrated Loop Physical Address ($AL_{13}$ PA) that is unique within the loop 206, 208 for that port. This effectively uniquely identifies each port 211, 212 in a loop 206, 208.

The loop initialisation involves one port winning as Loop Initialisation Master (LIM). The LIM port manages the initialisation procedure. Disk drives 210 can indicate that they do not wish to be the LIM. The Arbitrated Loop Physical Addresses ($AL_{13}$ PAs) are then allocated to each of the ports 211, 212 in the loop 206, 208. The LIM sends a frame around the loop 206, 208 with bits corresponding to $AL_{13}$ PAs. Each port 211, 212 finds the relevant bit for its AL_PA and changes the bit from "0" to "1" indicating that the $AL_{13}$ PA is not available for subsequent ports. The AL_PAs can be defined by previous addresses, assigned hardware addresses or software addresses. If there are multiple enclosures, each address indicates the enclosure and the device within the enclosure ensuring that each port 211, 212 in a loop 206, 208 has a unique address.

The initialisation procedure can also send special frames around the loop 206, 208 called the Loop Initialisation Report Position (LIRP) frame and the Loop Initialisation Loop Position (LILP) frame which detail the topology of the loop as seen by the Loop Initialisation Master (LIM). This involves each port 211, 212 indicating in a frame its AL_PA in the order that it is physically situated in the loop. This frame contains each port's AL_PA in turn as seen by the LIM for the whole of the loop and is broadcast around the loop.

The loop initialisation allows a host bus adapter 207, 209 to know where each port 211, 212 is in relation to the adapter 207, 209. The host bus adapter 207, 209 will identify all the devices in a loop including, for example, SES devices as distinct from disk drives and may also determine from an SES devices details of the ports housed within that SES device's enclosure.

Each port 211, 212 in a loop network 200 has a port identifier called a "World Wide Port Name" (WWPN). Each node on a loop 206, 208 in the form of devices 210 or host bus adapters 207, 209 also has a World Wide Node Name (WWNN). These are referred to as Node Names and Port Names. To ensure that the WWPN and WWNN are unique they may contain, for example, a unique identifier of the manufacturer of the device including the port and the manufacturer's serial number of the device. The WWPN is too long (usually 64 bits) to be used for source and destination addresses transmitted over the network and therefore the AL_PA is used as a temporary address that is unique to the configuration of the network at any given time.

A log in process is instigated by an initiator after the loop initialisation has completed. An initiator issues PDISC or ADISC frames to all observed AL_PAs, to 'discover' information about the AL_PAs. This identifies targets that the initiators should log in with. PDISC may be accepted by an ACC frame or rejected with an $LS_{13}$ RJT frame. Next, the initiator will attempt to Port Log In (PLOGI) with all the identified targets, i.e. all targets where there was a successful PDISC or ADISC and the device was identified as being a target. This may be accepted with an ACC frame or rejected with an $LS_{13}$ RJT frame. Once accepted, a port log out (LOGO) may occur at any stage thereafter. After the PLOGI, a Process Log In (PRLI) occurs to establish a SCSI or similar connection. Again there is an ACC frame or an $LS_{13}$ RJT frame. Once processed logged in then a Process Log Out (PRLO) may occur at any time thereafter. In some environments, targets keep track of open exchanges with initiators. In the described environment, after every loop initialisation, targets are required to validate the log-ins and if anything has changed then a LOGO is issued, forcing the initiator to start the log in process again. When there is more than one initiator in a loop, each initiator must send PLOGI frames to each of the targets. A target may, having already logged in, decide to log out with some but not all initiators.

In the described embodiment, the initiators in the form of host bus adapters 207, 209 communicate with each other to obtain a common set of devices which are available and specify which port is to be used for a device with more than one port.

The information sent between initiators can be as follows: Each host bus adapter 207, 209 sends a Vendor Unique SCSI command to each other host bus adapter 207, 209. The reply contains that host bus adapter's relevant data. For example:

Mapping via Loop IDs instead of AL_PAs (loop IDs have a one to one mapping with AL_PAs and loop IDs are in the range 0 to 126 inclusive).Table of one entry per loop ID, the first entry being for loop ID 0 and the last being for loop ID 126.0=OK1=NotOK. Each host bus adapter 207, 209 sends its own table with its own relevant data. Each host bus adapter then logically ORs each received entry in the table with each entry in its own table (the one it sent), for each loop ID, keeping a separate table as the result. This result is the merged view and is the same on every host bus adapter 207, 209. Therefore, each host bus adapter 207, 209 knows which ports are OK and which ports are not OK.

In environments with multi-ported host bus adapters, this communication of tables must be carried out for each loop 206, 207.

Referring to FIG. 2A, at initialisation of a first loop 206, the initialisation procedure obtains and transmits around the loop 206 a Loop Initialisation Loop Position (LILP) frame as previously described which contains the AL_PAs of each of the five ports 211 on loop 206 in the order that they are physically located in the loop 206. The Node Names and Port Names are determined for all of the AL_PAs on the first loop 206 except, in this example, for port 1 of device Y 204 which has not reported its Node Name and is therefore eliminated.

Initialisation is also carried out for the second loop 208 in the loop network 200 and the LILP frame with the AL_PAs of the five ports 212 on the second loop 208 is transmitted around the loop 208. The Node Names and Port Names are determined for all the AL_PAs of the five ports 212 on the second loop 208.

Any AL_PAs that do not report their Node Name must be eliminated and a record of the elimination kept. This is done by any initiators, i.e. the host bus adapters 207, 209, that wish to share access to the same devices 210 in the loop network 200.

After the loop initialisation procedure has been completed, a log in procedure is carried out. At log in, the host bus adapter A 207 which is an initiator sends a PLOGI frame to each of the targets in the form of the five devices 210. The second host bus adapter B 209 also sends a PLOGI frame to each of the five devices 210. It is possible that the response frame sent by one device, for example device W 202, is different in response to each of the two PLOGI frames sent by the two host bus adapters 207, 209. An ACC frame may be sent to host bus adapter A 207 and a $LS_{13}$ RJT frame may be sent to host bus adapter B 209. This results in an inconsistent picture being obtained by the host bus adapters 207, 209 of the availability of the device W 202.

The record of AL_PAs to be ignored due to their elimination or failure to log in is then communicated to all other initiators. The records are then merged at each initiator to result in a common set of AL_PAs to be used by the initiators with each AL_PA having a Node Name and a Port Name.

Host bus adapter A sends a frame to host bus adapter B indicating that device Y 204 is to be ignored as it did not report its Node Name. Host bus adapter B sends a frame to host bus adapter A indicating that port 1 of device W 202 is not logged on and is therefore to be ignored. The host bus adapters 207, 209 combine the information from the other host bus adapter 207, 209 into a single list of AL_PAs which can be used by the host bus adapters 207, 209 merging any devices that have the same Node Name into one entry, but keeping both sets of data.

A host bus adapter 207, 209 which is aware of an on-going problem with a particular device 210 can elect not to use that device and this is communicated to the other host bus adapters 207, 209 and the ports of the particular device will not be present in the single list of AL_PAs which is then used by all host bus adapters 207, 209.

Figure 2B:
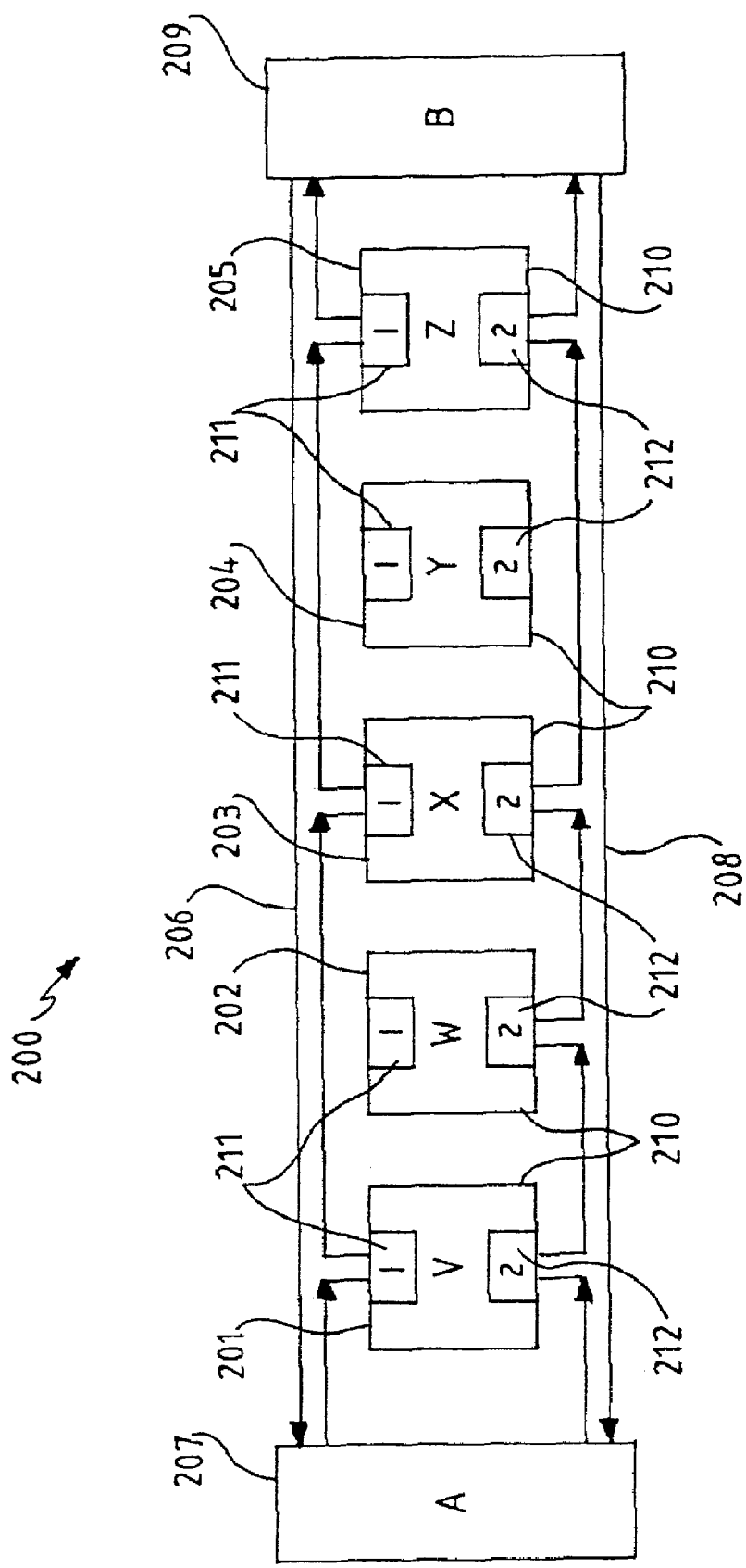

FIG. 2B shows the arrangement of active ports 211, 212 in the resultant single list of AL_PAs as determined by the communication between the host bus adapters 207, 209 in the loop network 200 of FIG. 2A. Devices V 201, X 203 and Z 205 have both ports 1211 and 2 212 active on the first and second loops 206, 208. Device W 202 only has port 2 on the second loop 208 active. Device Y 204 has neither ports 1 nor 2 active.

In addition, the described embodiment provides an algorithm which is applied by both host bus adapters 207, 209 to determine which port 211, 212 to use for devices 210 which have two available ports 211, 212. The result is a set of devices 210 which are seen by both host bus adapters 207, 209 in the same order with the same port of a device 210 defined for use by both host bus adapters 207, 209. Both host bus adapters 207, 209 will communicate with a device 210 via the same port and therefore the same loop 206, 208 is used by both host bus adapters 207, 209 for that device 210. Different loops 206, 208 can be used for other devices 210. The second port of a dual-ported device 210 which is not defined as the communicating port, is still available as a port should the communicating port be bypassed.

At the end of the algorithm, the choice of which port to use will be the same on each host port adapter 207, 209 and the use of ports will be spread as evenly as possible across the ports 211, 212 of the dual ported devices 210.

The algorithm includes the following steps:

Count the number of single port access devices only accessible by a port on the first loop.

Count the number of single port access devices only accessible by a port on the second loop.

Determine a starting balance of device access.

Take each Node Name in order with the lowest Node Name first that has both AL_PAs and therefore both ports active and choose the AL_PA for the port that moves the balance towards zero. In other words, use the least utilised loop to the device where the choice exists.

If the balance is already zero choose the AL_PA for the port with the lowest Port Name.

Figure 3:
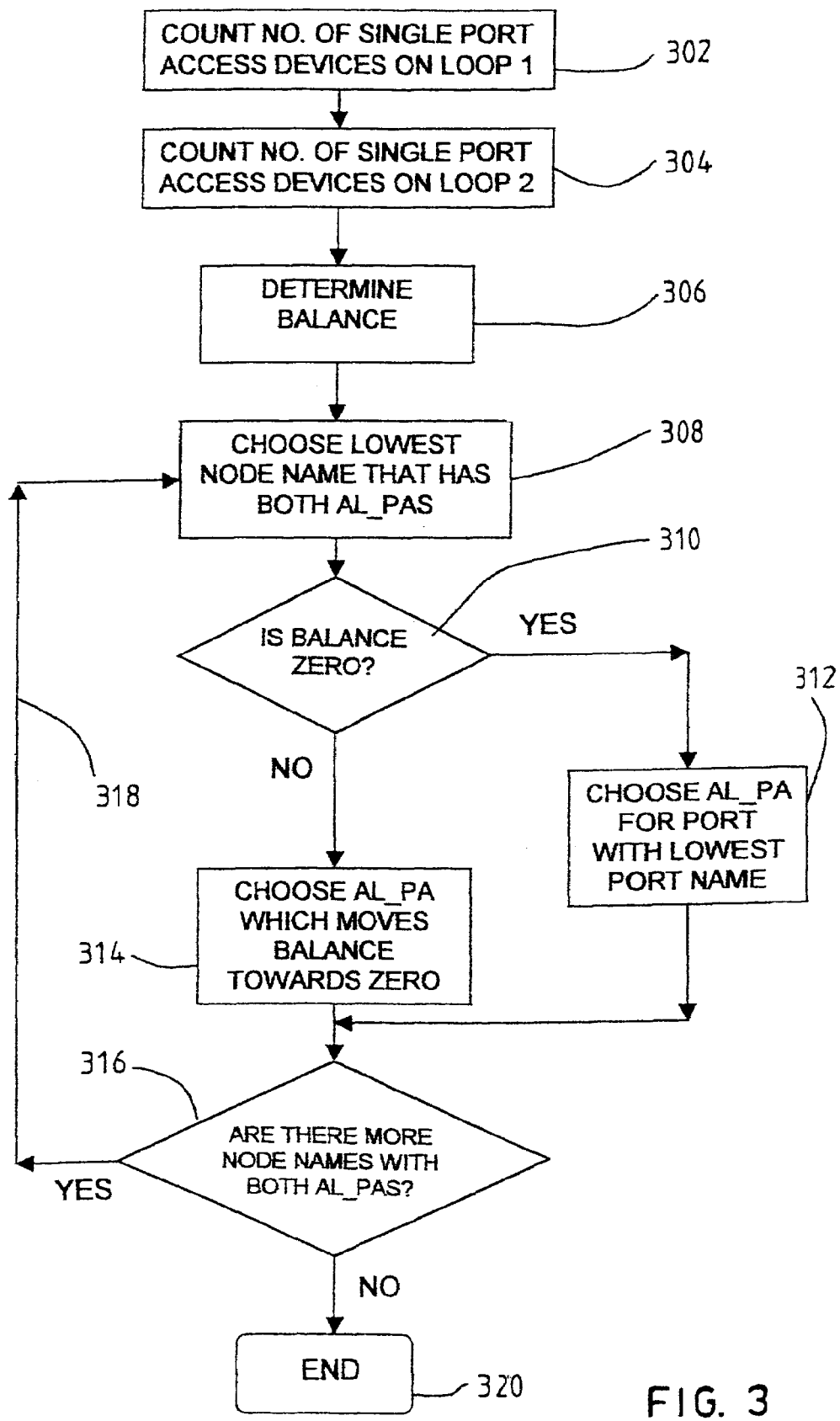
FIG. 3 is a flow diagram of an algorithm in accordance with the present invention.

FIG. 3 is a flow diagram illustrating the algorithm 300 of port selection. The first steps 302, 304 are to count the number of single port access devices on each of the first and second loops.

The next step 306 is to determine the balance of single port access devices across the loops. Each device with two active ports is then taken in turn 308 starting with the lowest Node Name. A decision 310 is then taken as to whether or not the balance determined at step 306 is zero. If the balance is zero, the port is chosen 312 with the lowest Port Name. If the balance is not zero, the port is chosen 314 which moves the balance towards zero.

A decision 316 is then taken as to whether or not there are more devices with two active ports. If there are more devices with two active ports, a loop 318 returns to step 308 and takes the next lowest Node Name. If there are no more devices with two active ports the algorithm is finished 320.

If there are more than two loops, this can also be accommodated by counting the number of single port access devices on any additional loops and attempting to balance the port access between all the loops.

Examples are now given of the described method of balancing port accesses.

In Table 1, there are five devices 210 as shown in FIG. 2A, each device 210 having a port 211 on a first loop 206 and a port 212 on a second loop 208. All devices 210 have both ports 211, 212 active. The algorithm will determine that there is no bias between the loops 206, 208 and as a result will evenly distribute the ports chosen to be used by the host bus adapters 207, 209 for each device 210. The chosen ports are shown underlined in Table 1.

TABLE 1

| PORT ON LOOP1 | <u>1</u> | 1 | <u>1</u> | 1 | <u>1</u> |
|---|---|---|---|---|---|
| DEVICE | V | W | X | Y | Z |
| PORT ON LOOP2 | 2 | <u>2</u> | 2 | <u>2</u> | 2 |

Table 2 illustrates the example shown in FIG. 2B in which device W 202 has only one port (port 2) active and device Y 204 is not used. The algorithm determines that device W 202 is a single port access device and there is a bias to loop 2. The algorithm then determines that device V 201 should be accessed by port 1 as this brings the balance of the loops to zero. The port of device X 203 is chosen by the lowest Port Name which is port 1 in the example. The balance is then biased to loop 1 which has two ports whereas loop 2 has only one port. Therefore, the algorithm chooses port 2 for device Z 205 which again brings the balance to zero.

TABLE 2

| PORT ON LOOP 1 | <u>1</u> |   | <u>1</u> |   | <u>1</u> |
|---|---|---|---|---|---|
| DEVICE | V | W | X | Y | Z |
| PORT ON LOOP 2 |   | <u>2</u> | 2 |   | <u>2</u> |

Another example is shown in Table 3 in which device X 203 has only one port access which is port 1 and device Z 205 has only one port access which is port 2. Therefore, the balance is zero. The remaining devices have the access ports determined to distribute the accesses as evenly as possible across loops 1 and 2.

TABLE 3

| PORT ON LOOP 1 | <u>1</u> | 1 | <u>1</u> | <u>1</u> |   |
|---|---|---|---|---|---|
| DEVICE | V | W | X | Y | Z |
| PORT ON LOOP 2 | 2 | <u>2</u> | 2 |   | <u>2</u> |

Devices may be included on loops within a loop network which are only single ported and these devices are counted in the algorithm as devices with single port access. No distinction is made as to whether there is a port which is not being used as it did not respond to a log in command or whether there is only one port. The balance of use of ports between loops in a loop network results in performance improvement by making use of the full bandwidth of the loops. The method described herein is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

What is claimed is:

1. A method for managing a loop network, the loop network including at least two loops, a plurality of devices connected to the at least two loops via ports, wherein at least two of the devices are initiators, the method including: each initiator sending a frame to all other initiators in the loop network identifying any ports which are not to be used, wherein the frame either lists all the ports which can be used or lists all the ports which cannot be used; each initiator merging the information from all other initiators with its own information identifying any ports which are not to be used; resulting in all the initiators generating a single set of ports to be used which is consistent across all the initiators, wherein each initiator applies an algorithm to determine the single set of ports to be used by all the initiators and to balance port accesses across the loop network, wherein the algorithm counts for each loop a number of single port access devices only accessible by a port on that loop and then determines a balance value of accesses across the loops, the method selecting a successive port so as to reduce the balance value towards zero, wherein the algorithm selects a least utilized route to a device.

2. A method as claimed in claim 1, wherein a port is identified as not to be used if it does not report a node name and a port name to an initiator during initialisation of a loop.

3. A method as claimed in claim 1, wherein a port is identified as not to be used if it does not log on to an initiator.

4. A method as claimed in claim 1, wherein the loop network is a Fibre Channel Arbitrated Loop (FC-AL) network with dual loops and at least some devices having ports on each of the dual loops.

* * * * *